(12) United States Patent
Khan et al.

(10) Patent No.: US 11,175,373 B2
(45) Date of Patent: Nov. 16, 2021

(54) APPARATUSES, METHODS AND COMPUTER-READABLE CODE RELATING TO RADIOMAP DATA

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 88 days.

(21) Appl. No.: 15/739,633

(22) PCT Filed: Jun. 24, 2015

(86) PCT No.: PCT/EP2015/064250
§ 371 (c)(1),
(2) Date: Dec. 22, 2017

(87) PCT Pub. No.: WO2016/206736
PCT Pub. Date: Dec. 29, 2016

(65) Prior Publication Data
US 2018/0180705 A1    Jun. 28, 2018

(51) Int. Cl.
*G01S 5/02* (2010.01)

(52) U.S. Cl.
CPC .......... *G01S 5/0252* (2013.01); *G01S 5/0221* (2013.01); *G01S 5/0236* (2013.01); *G01S 5/0205* (2013.01); *G01S 5/0257* (2013.01)

(58) Field of Classification Search
CPC .... G01S 5/0205; G01S 5/0221; G01S 5/0236; G01S 5/0252; G01S 5/0257; G01S 5/027;
(Continued)

(56) References Cited

U.S. PATENT DOCUMENTS

2008/0130604 A1    6/2008 Boyd
2008/0176583 A1*   7/2008 Brachet ................. G01S 5/0236
                                                         455/456.3
(Continued)

FOREIGN PATENT DOCUMENTS

CN    102474814 B    5/2015
WO    WO 2011/066464 A2    6/2011
(Continued)

OTHER PUBLICATIONS

International Search Report and Written Opinion for Application No. PCT/EP2015/064250 dated Mar. 16, 2016, 11 pages total.

(Continued)

*Primary Examiner* — Yuwen Pan
*Assistant Examiner* — Hung K Du
(74) *Attorney, Agent, or Firm* — Alston & Bird LLP (57) ABSTRACT

This specification describes a method comprising accessing radiomap data including location information indicating locations of plural nodes of a first class, each of the plural nodes of the first class being identifiable only by a locally-unique identifier, the locally unique identifier of each of the plural nodes being included in the radiomap data, and using the radiomap data to determine a location within a space of a radio communication apparatus based on at least one transmission received by the radio communications apparatus from at least one of the plural nodes of the first class, the at least one transmission including the locally-unique identifier of the node from which the transmission is received.

33 Claims, 5 Drawing Sheets

(58) Field of Classification Search
CPC .... G01S 5/0242; G01S 5/0289; H04W 4/021; H04W 4/029; H04W 4/027; H04W 8/005; H04W 48/20; H04W 84/12; H04W 4/02; H04W 4/024; H04W 84/045; H04L 67/2857

See application file for complete search history.

(56) References Cited

U.S. PATENT DOCUMENTS

| | | | |
|---|---|---|---|
| 2008/0274752 A1 | 11/2008 | Houri | |
| 2009/0092111 A1 | 4/2009 | Horn et al. | |
| 2011/0014913 A1 | 1/2011 | Yoon et al. | |
| 2012/0016626 A1* | 1/2012 | Laine | G01S 5/0236 702/150 |
| 2013/0225165 A1* | 8/2013 | Das | H04W 48/16 455/434 |
| 2014/0099916 A1* | 4/2014 | Mallikarjunan | H04W 8/20 455/406 |
| 2014/0295878 A1 | 10/2014 | Yang et al. | |
| 2015/0327214 A1* | 11/2015 | Buck, Jr. | G01S 19/48 455/456.1 |
| 2015/0351017 A1* | 12/2015 | Wirola | H04W 64/00 370/338 |
| 2016/0088429 A1* | 3/2016 | Gao | G01S 5/0045 455/456.1 |
| 2016/0161592 A1 | 6/2016 | Wirola et al. | |
| 2016/0373888 A1* | 12/2016 | Kingsbury | H04W 64/00 |
| 2017/0055334 A1* | 2/2017 | Pandharipande | H05B 37/0272 |

FOREIGN PATENT DOCUMENTS

| | | | | |
|---|---|---|---|---|
| WO | WO 2012/032376 A1 | 3/2012 | | |
| WO | WO 2012/038779 A1 | 3/2012 | | |
| WO | WO-2012032376 A1 * | 3/2012 | ............ | H04W 64/00 |
| WO | WO 2014/024005 A1 | 2/2014 | | |
| WO | WO-2014024005 A1 * | 2/2014 | | |

OTHER PUBLICATIONS

IBeacon—Wikipedia [online] [retrieved Sep. 30, 2019]. Retrieved via the Internet: https://web.archive.org/web/20171210175854/https://en.wikipedia.org/wiki/IBeac on (dated Dec. 10, 2017) 8 pages.

http://www.infsoft.com/Products/Indoor-GPS-Hardware/iBeacon [online] [retrieved Oct. 2, 2019]. Retrieved via the Internet: https://web.archive.org/web/20150315045944/http://www.infsoft.com/ (dated Mar. 15, 2015) 3 pages.

Bluetooth lowenergy—Triangulate example for iBeacons—Stack Overflow [online] [retrieved Oct. 2, 2019]. Retrieved via the Internet: https://web.archive.org/web/20150317151306/https://stackoverflow.com/questions/20332856/triangulate-example-for-ibeacons (dated Mar. 17, 2015) 5 pages.

Office Action for European Application No. 15 733 396.4 dated Feb. 25, 2020, 5 pages.

Office Action for Chinese Application No. 201580082559.6 dated Mar. 3, 2021, 30 pages.

Office Action for European Application No. 15 733 396.4 dated Jun. 15, 2021, 8 pages.

* cited by examiner

FIG. 4

APPARATUSES, METHODS AND COMPUTER-READABLE CODE RELATING TO RADIOMAP DATA

FIELD

This specification relates generally to the use and/or creation of radiomap data.

BACKGROUND

Indoor positioning requires systems and solutions that are specifically developed and deployed for the purpose. The "traditional" positioning technologies which are used mainly outdoors (e.g. satellite and cellular positioning technologies) may not deliver sufficient performance indoors to enable seamless and equal navigation experience in both environments. The required positioning accuracy (2-3 m), coverage (~100%) and floor detection may be challenging to achieve with satisfactory performance levels with systems and signals that were not specifically designed for use indoors. Satellite-based radio navigation signals simply do not penetrate through the walls and roofs sufficiently for adequate signal reception and cellular signals have too narrow bands for accurate ranging.

Several dedicated indoor solutions have already been developed and commercially deployed in recent years. Such dedicated indoor solutions include those based on pseudolites (GPS-like short-range beacons), ultra-sound positioning, BTLE signals and WiFi fingerprinting. However, these solutions may often require deployment of totally new infrastructure and, in many situations, this is not feasible.

SUMMARY

In a first aspect, this specification describes a method comprising: accessing radiomap data including location information indicating locations of plural nodes of a first class, each of the plural nodes of the first class being identifiable only by a locally-unique identifier, the locally unique identifier of each of the plural nodes being included in the radiomap data; using the radiomap data to determine a location within a space of a radio communication apparatus based on at least one transmission received by the radio communications apparatus from at least one of the plural nodes of the first class, the at least one transmission including the locally-unique identifier of the node from which the transmission is received.

The locally-unique identifier of each of the nodes of the first class may be visible to radio communication apparatus of a first type without the radio communication apparatus of the first type having prior knowledge of the locally-unique identifier but invisible to radio communication apparatus of a second type without the radio communication apparatus of the second type having prior knowledge of the locally-unique identifier. The radio communication apparatus of the first type may be configured to utilise a different operating system than do radio communication apparatuses of the second type. Data for the radiomap data may be created using one or more radio communication apparatuses of the first type.

Using the radiomap data to determine the location within the space may comprise scanning for transmissions from each of a set of one or more of the plural nodes of the first class whose locally-unique identifiers are identified by the radiomap data. The method may further comprise identifying a portion of the radiomap data based on a globally unique identifier received at the radio communications apparatus, the globally unique identifier enabling identification of the space, wherein the portion of the radiomap data is associated with the set of nodes and indicates relative locations within the space of the nodes of the set, and using the identified portion of the radiomap data to determine the location within the space of a the radio communication apparatus. Accessing the radiomap data may comprise accessing only the identified portion of the radiomap data The method may further comprise the radio communications apparatus searching for a globally unique identifier for enabling identification of the space, and in response to detecting a globally unique identifier for enabling identification of the space, identifying the portion of the radiomap data based on the globally unique identifier and using the identified portion of the radiomap data to determine the location of the radio communications device.

The method may comprise, if a globally unique identifier for enabling identification of the space is not detected, scanning for transmissions from at least one of the plural nodes of the first class identified by the radiomap data, and identifying the portion of the radiomap data based on at least one transmission received in response to the scanning and using the identified portion of the radiomap data to determine the location the radio communications device. The searching for a globally unique identifier for enabling identification of the space may comprise scanning for nodes of a second class, nodes of the second class each having an associated globally unique identifier.

The method may comprise: scanning for transmissions from at least one of the plural nodes of the first class identified by the radiomap data; identifying a portion of the radiomap data based on at least one transmission received in response to the scanning; and using the identified portion of the radiomap data to determine the location within the space of the radio communication apparatus.

In some examples, the at least one of the plural nodes of the first class identified by the radiomap data from which transmissions are scanned may be a selected subset of all the plural nodes of the first class identified by the radiomap data. Information for enabling identification of the selected subset of nodes may be received from remote server apparatus. The selected subset of nodes may have been identified has high priority nodes.

Identifying the portion of the radiomap data based on at least one transmission received in response to the scanning for transmissions from at least one of the plural node of the first class identified by the radiomap data may comprise: successively discounting parts of the radiomap data based on transmissions successively received from different ones of the plural nodes of the first class identified by the radiomap data, thereby to arrive at the identified portion of the radiomap data.

Accessing the radiomap data may comprise downloading the radiomap data from a remote server.

In a second aspect, this specification describes a method comprising: using a radio communication apparatus of a first type to scan for plural nodes of a first class provided within a space, each of the plural nodes of the first class being identifiable only by a locally-unique identifier, the locally-unique identifier being visible to radio communication apparatuses of the first type without the radio communication apparatuses of the first type having prior knowledge of the locally-unique identifier and being invisible to radio communication apparatus of a second type without the radio communication apparatus of the second type having prior knowledge of the locally-unique identifier; and based on results of the scan, creating a portion of radiomap data including the locally-unique identifiers of the plural nodes and location information indicating relative locations within the space of the plural nodes of a first class. The radio communication apparatus of the first type may configured to utilise a different operating system than do the radio communication apparatuses of the second type. The method may comprise associating a globally-unique identifier for enabling identification of the space associated with the portion of radiomap data. The globally-unique identifier may be that of a node of a second class, the at least one node of the second class being geographically associated with the space. The method may comprise using the radio communication apparatus of the first type to scan for nodes of the second type which are geographically associated with the space. The method may comprise associating the globally-unique identifier of the least one node of the second class with the portion of radiomap data in response to detecting the node of the second type during the scan for nodes of the second type. The method may comprise positioning at least one node of the second class in geographical association with the space.

In a third aspect, this specification describes apparatus configured to perform a method according as described above with reference to either of the first and second aspects.

In a fourth aspect, this specification describes apparatus comprising: at least one processor; at least one memory having computer-readable code stored thereon, the computer-readable code, when executed by the at least one processor, causing the apparatus at least: to access radiomap data including location information indicating locations of plural nodes of a first class, each of the plural nodes of the first class being identifiable only by a locally-unique identifier, the locally unique identifier of each of the plural nodes being included in the radiomap data; and to use the radiomap data to determine a location within a space of a radio communication apparatus based on at least one transmission received by the radio communications apparatus from at least one of the plural nodes of the first class, the at least one transmission including the locally-unique identifier of the node from which the transmission is received. The locally-unique identifier each of the nodes of the first class may visible to radio communication apparatus of a first type without the radio communication apparatus of the first type having prior knowledge of the locally-unique identifier but invisible to radio communication apparatus of a second type without the radio communication apparatus of the second type having prior knowledge of the locally-unique identifier. The radio communication apparatus of the first type may configured to utilise a different operating system than do radio communication apparatuses of the second type. Data for the radiomap data may be created using one or more radio communication apparatuses of the first type.

The computer-readable code, when executed, may cause the apparatus to use the radiomap data to determine the location within the space by scanning for transmissions from each of a set of one or more of the plural nodes of the first class whose locally-unique identifiers are identified by the radiomap data. The computer-readable code, when executed, may cause the apparatus to: identify a portion of the radiomap data based on a globally unique identifier received at the radio communications apparatus, the globally unique identifier enabling identification of the space, wherein the portion of the radiomap data is associated with the set of nodes and indicates relative locations within the space of the nodes of the set; and use the identified portion of the radiomap data to determine the location within the space of a the radio communication apparatus.

Accessing the radiomap data may comprise accessing only the identified portion of the radiomap data The computer-readable code, when executed, may cause the apparatus to: search for a globally unique identifier for enabling identification of the space; and in response to detecting a globally unique identifier for enabling identification of the space, to identify the portion of the radiomap data based on the globally unique identifier and to use the identified portion of the radiomap data to determine the location of the radio communications device. The computer-readable code, when executed, may cause the apparatus to: if a globally unique identifier for enabling identification of the space is not detected, scan for transmissions from at least one of the plural nodes of the first class identified by the radiomap data; and identify the portion of the radiomap data based on at least one transmission received in response to the scanning and use the identified portion of the radiomap data to determine the location the radio communications device. The computer-readable code, when executed, may cause the apparatus to search for a globally unique identifier for enabling identification of the space by scanning for nodes of a second class, nodes of the second class each having an associated globally unique identifier. The computer-readable code, when executed, may cause the apparatus: to scan for transmissions from at least one of the plural nodes of the first class identified by the radiomap data; to identify a portion of the radiomap data based on at least one transmission received in response to the scanning; and to use the identified portion of the radiomap data to determine the location within the space of the radio communication apparatus.

The at least one of the plural nodes of the first class identified by the radiomap data from which transmissions are scanned may be a selected subset of all the plural nodes of the first class identified by the radiomap data. Information for enabling identification of the selected subset of nodes may have been received from remote server apparatus. The selected subset of nodes may have been identified as high priority nodes.

The computer-readable code, when executed, may cause the apparatus to identify the portion of the radiomap data based on at least one transmission received in response to the scanning for transmissions from at least one of the plural node of the first class identified by the radiomap data by successively discounting parts of the radiomap data based on transmissions successively received from different ones of the plural nodes of the first class identified by the radiomap data, thereby to arrive at the identified portion of the radiomap data.

Accessing the radiomap data may comprise downloading the radiomap data from a remote server.

In a fifth aspect, this specification describes apparatus comprising: at least one processor; at least one memory having computer-readable code stored thereon, the computer-readable code, when executed by the at least one processor, causing the apparatus at least: to use a radio communication apparatus of a first type to scan for plural nodes of a first class provided within a space, each of the plural nodes of the first class being identifiable only by a locally-unique identifier, the locally-unique identifier being visible to radio communication apparatuses of the first type without the radio communication apparatuses of the first type having prior knowledge of the locally-unique identifier and being invisible to radio communication apparatus of a second type without the radio communication apparatus of the second type having prior knowledge of the locally-unique identifier; and based on results of the scan, to create a portion of radiomap data including the locally-unique identifiers of the plural nodes and location information indicating relative locations within the space of the plural nodes of a first class. The radio communication apparatus of the first type may be configured to utilise a different operating system than do the radio communication apparatuses of the second type. The computer-readable code, when executed, may cause the apparatus to associate a globally-unique identifier for enabling identification of the space associated with the portion of radiomap data. The globally-unique identifier may be that of a node of a second class, the at least one node of the second class being geographically associated with the space. The computer-readable code, when executed, may cause the apparatus to use the radio communication apparatus of the first type to scan for nodes of the second type which are geographically associated with the space. The computer-readable code, when executed, may cause the apparatus to associate the globally-unique identifier of the least one node of the second class with the portion of radiomap data in response to detecting the node of the second type during the scan for nodes of the second type.

In a sixth aspect, this specification describes computer-readable code which, when executed by computing apparatus, causes the computing apparatus to perform a method as described with reference to either of the first and second aspects.

In a seventh aspect, this specification describes a computer-readable medium having computer-readable code stored thereon, the computer-readable code, when executed by at least one processor, causing performance of: accessing radiomap data including location information indicating locations of plural nodes of a first class, each of the plural nodes of the first class being identifiable only by a locally-unique identifier, the locally unique identifier of each of the plural nodes being included in the radiomap data; and using the radiomap data to determine a location within a space of a radio communication apparatus based on at least one transmission received by the radio communications apparatus from at least one of the plural nodes of the first class, the at least one transmission including the locally-unique identifier of the node from which the transmission is received.

In an eighth aspect, this specification describes a computer-readable medium having computer-readable code stored thereon, the computer-readable code, when executed by at least one processor, causing performance of: using a radio communication apparatus of a first type to scan for plural nodes of a first class provided within a space, each of the plural nodes of the first class being identifiable only by a locally-unique identifier, the locally-unique identifier being visible to radio communication apparatuses of the first type without the radio communication apparatuses of the first type having prior knowledge of the locally-unique identifier and being invisible to radio communication apparatus of a second type without the radio communication apparatus of the second type having prior knowledge of the locally-unique identifier; and based on results of the scan, creating a portion of radiomap data including the locally-unique identifiers of the plural nodes and location information indicating relative locations within the space of the plural nodes of a first class.

In a ninth aspect, this specification describes apparatus comprising: means for accessing radiomap data including location information indicating locations of plural nodes of a first class, each of the plural nodes of the first class being identifiable only by a locally-unique identifier, the locally unique identifier of each of the plural nodes being included in the radiomap data; and means for using the radiomap data to determine a location within a space of a radio communication apparatus based on at least one transmission received by the radio communications apparatus from at least one of the plural nodes of the first class, the at least one transmission including the locally-unique identifier of the node from which the transmission is received.

In a tenth aspect, this specification describes apparatus comprising: means for using a radio communication apparatus of a first type to scan for plural nodes of a first class provided within a space, each of the plural nodes of the first class being identifiable only by a locally-unique identifier, the locally-unique identifier being visible to radio communication apparatuses of the first type without the radio communication apparatuses of the first type having prior knowledge of the locally-unique identifier and being invisible to radio communication apparatus of a second type without the radio communication apparatus of the second type having prior knowledge of the locally-unique identifier; and means for creating, based on results of the scan, a portion of radiomap data including the locally-unique identifiers of the plural nodes and location information indicating relative locations within the space of the plural nodes of a first class.

BRIEF DESCRIPTION OF THE FIGURES

For a more complete understanding of the methods, apparatuses and computer-readable instructions described herein, reference is now made to the following descriptions taken in connection with the accompanying drawings in which.

DETAILED DESCRIPTION OF THE EMBODIMENTS

In the description and drawings, like reference numerals may refer to like elements throughout.

Figure 1:
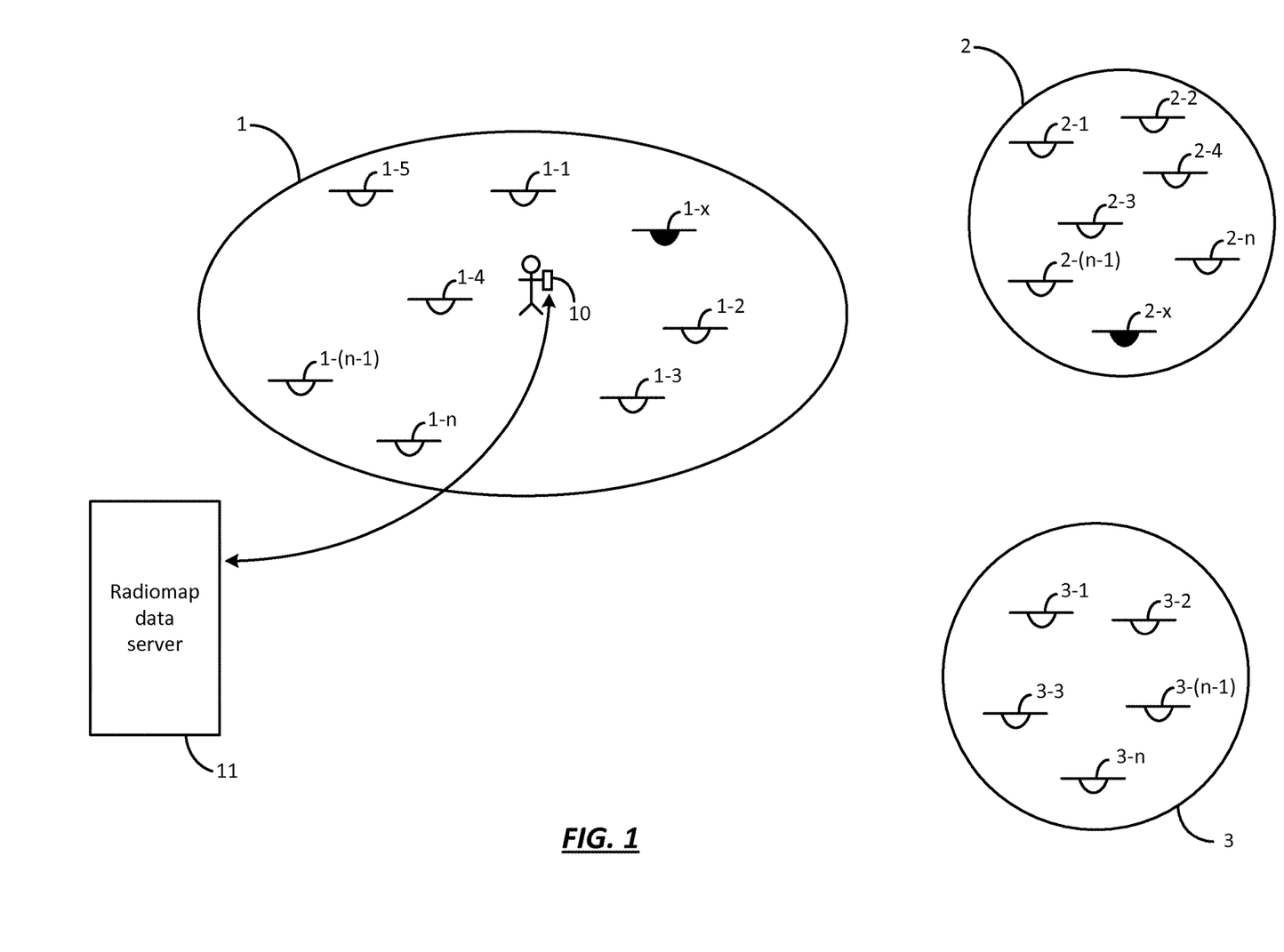
FIG. 1 is a simplified schematic illustrating a system in which various apparatuses, systems, methods and computer programs relating to radiomap data might be implemented.

FIG. 1 is a simplified schematic illustrating a system in which various apparatuses, systems, methods and computer programs relating to radiomap data might be implemented.

The system includes one or more spaces 1, 2, 3 (for instance, three spaces 1, 2, 3 as is the case in the example of FIG. 1), which may be indoor spaces. The spaces 1, 2, 3 may be, for instance, shopping malls, individual floors of shopping malls, hospitals, schools, factories and/or any other type of space (indoor or outdoor) in which it might be desirable to provide positioning services.

Provided within each of the spaces 1, 2, 3 are a plurality of nodes 1-1 to 1-n, 2-1 to 2-n, 3-1 to 3-n of a particular, e.g. first, class. The nodes of the first class are configured to transmit wireless data packets (which may simply be referred to as transmissions) which are receivable by radio communication apparatuses 10. The wireless data packets transmitted by the nodes 1-1 to 1-*n*, 2-1 to 2-*n* of the first class may include any type of data, such as but not limited to advertisement data. For instance, in a scenario in which the first space 1 is a shopping mall, each of the nodes may transmit advertising data relating to a particular merchant or product, near to which the node 1-1 to 1-*n*, 2-1 to 2-*n* is located.

The nodes 1-1 to 1-*n*, 2-1 to 2-*n*, 3-1 to 3-*n* of the first class are configured such that they are identifiable only by a locally-unique identifier. The locally-unique identifier of each of the nodes 1-1 to 1-*n*, 2-1 to 2-*n*, 3-1 to 3-*n* of the first class is visible to radio communication apparatuses of a particular, e.g. first, type without the radio communication apparatuses of the first type having prior knowledge of the locally-unique identifier. However, the locally-unique identifiers are invisible to radio communication apparatus of a different, e.g. second, type which does not have prior knowledge of the locally-unique identifiers. As such, apparatuses of the first type are configured so as to be able to discern a node's LUID from transmissions received from the node, without having prior knowledge of the LUID, whereas apparatuses of the second type are not. Radio communication apparatuses of the first type may be configured to utilise a different operating system than do radio communication apparatuses of the second type.

A locally-unique identifier (LUID) is an identifier which does not, by itself without some additional information, allow the device or apparatus to be definitively identified on a global scale. Put another way, more than one device or apparatus may have the same associate LUID. LUIDs may, however, serve to enable identification of a device or apparatus with which it is associated on some local level. LUIDs are in contrast to globally unique identifiers (GUIDs), which (are in all likelihood) unique throughout the entire world. As such, in general, only one device or apparatus will have a particular GUID.

The nodes 1-1 to 1-*n*, 2-1 to 2-*n*, 3-1 to 3-*n* of the first class may be configured to communicate using any suitable wireless communication protocol. For instance, but not exclusively, they may be configured to transmit data packets using Bluetooth Low Energy (BLE).

One specific type of node of the first class is the iBeacon™ by Apple Inc.®. iBeacons™ are configured to transmit packets using BLE. Their locally-unique identifiers (LUIDs) are invisible to radio communication apparatus (such as mobile devices) running Apple Inc's operating system "iOS" (as a result of iOS's configuration), where the iOS apparatus does not have prior knowledge of the LUID. However, the LUID of the iBeacon™ is visible to radio communications apparatuses running operating systems other than iOS, even without prior knowledge of the LUID. As such, apparatuses running operating systems other than iOS are able to determine an iBeacon's LUID based on transmissions received from the iBeacon™.

One particular example of a radio communications apparatuses of the first type are apparatuses running Google's Android operating system. Other apparatuses of the first type include apparatuses running various other non-iOS operating systems, including but not limited to Linux OS.

Figure 2:
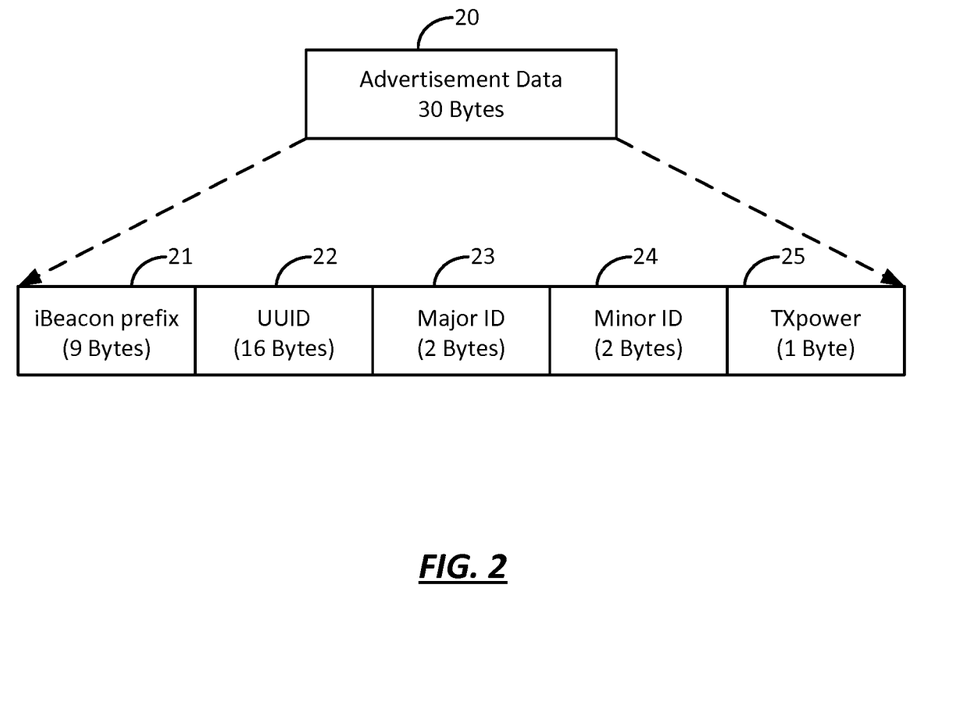
FIG. 2 illustrates an example of a format of advertisement data included in data packets which are transmitted by iBeacons™.

LUIDs of the iBeacons are defined by a combination of a 16 Byte UUID field, a 2 byte major ID field and a 2 byte minor ID field. These fields are provided within the advertisement data of the data packets transmitted by the iBeacons. FIG. 2 illustrates an example of a format of advertisement data 20 from data packets which are transmitted by iBeacons. The advertisement data 20 (which may be 30 bytes) includes an iBeacon™ prefix field 21 (which may be 9 bytes), a UUID field 22, a major ID field 23, a minor ID field 24 and a TX power field 25 (which may be 1 byte).

The use of iBeacons within spaces such as shopping malls and the like is reasonably common. It might, therefore, be desirable to utilise the already-installed iBeacons to enable accurate positioning of apparatuses within the spaces. One possible way of providing this may be for the owner of plural iBeacons within a space to distribute information including the LUIDs of each of their iBeacons along with location information (e.g. co-ordinates) indicating the locations of the iBeacons within the space. Having received this information, various radio communications apparatus (including those running iOS and Android) may be able to use, for instance, triangulation to determine an approximate location of the apparatus within the space.

However, this approach may not be appropriate in all scenarios. For instance, the iBeacons within a particular space may be owned by various different entities (e.g. by different merchants within a shopping mall). Consequently, no single entity would have access to all of the LUIDs of the iBeacons and so there may not be sufficient information to allow the radio communication apparatus to determine its location within the space.

One or more of the spaces 1, 2, 3 may also have provided, in geographical association with the space, at least one node 1-*x*, 2-*x* of a different, e.g. second, class to the nodes of the first class. A node of a second class has an associated GUID. Being provided in geographical associated may include one or more of: being in the space, being near the space such that transmissions can be received from the node of the second class by a radio communication apparatus within the space, or being near the space such that transmissions can be received by the radio communication apparatus immediately prior to (very shortly before) entering the space. In the example of FIG. 1, each of the first and second spaces 1, 2 has a single node of the second class 1-*x*, 2-*x* and the third space 3 has no node of the second class. Nodes of the second class include any wireless transmission apparatus which is able to make its GUID available to radio communication apparatuses. In some examples, the node of the second class may be a BLE-capable beacon which transmits its GUID in advertisement data of a BLE advertising packet. The nodes of the second class 1-*x*, 2-*x* may be configured to communicate using the same wireless transmission protocol as do the nodes of the first class. This may be beneficial as it allows mobile radio communication apparatuses to communicate with both classes of node using only a single protocol (and associated hardware). However, this may not be the case and instead the nodes of the first and second classes may be configured to operate using different protocols. For instance, the nodes of the first class may use BLE and the nodes of the second class may use WiFi.

In the example of FIG. 1, a radio communication apparatus 10 is provided within the first space 1. The radio communication apparatus 10 may be a mobile communication device 10 carried by a user. The type of the apparatus 10 (e.g. whether it is of the first or second type) may depend on a particular scenario in which the apparatus 10 is involved. This will be discussed in more detail with respect to FIGS. 3 and 4.

The system may further comprise a radiomap data server 11 configured to store radiomap data. The radiomap data server may be further configured to transmit and/or receive radiomap data to/from the radio communication apparatus 10.

As will be discussed in more detail below, radiomap data includes the locally-unique identifiers of the plural nodes of the first class and location information indicating relative locations within the space of the plural nodes of a first class. In general, a radiomap may be described as a collection of radio models (or radio images) of access points (e.g. nodes) within a system. Radiomap data may in some examples include exact location information of the node. In other examples however, the location information may be less specific and may, for instance, indicate the coverage area of the node. As such, the location information may be, broadly-speaking, described as a geographical reference for each node. Radiomaps in general, and their use for indoor positioning, are known in the art (see for instance WO2012/032376, WO2014/024005, WO 2012/038779 A1 which are hereby incorporated by reference) and so they are not described in further detail in this specification.

Figure 3:
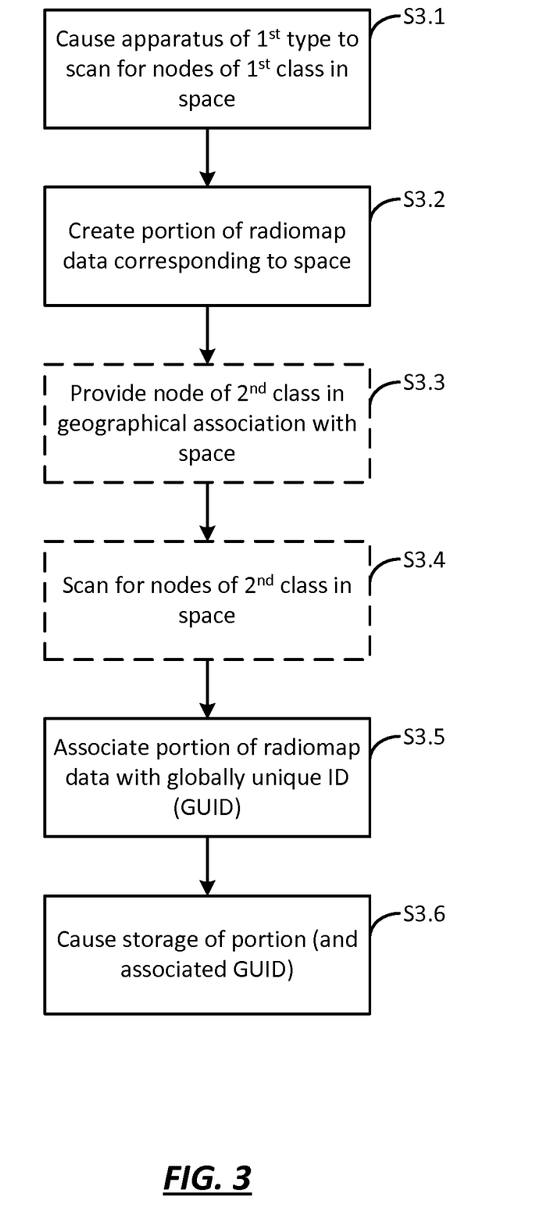
FIG. 3 is a flow chart illustrating a method for creating radiomap data, which may be performed within a system such as that described with reference to FIG. 1.

FIG. 3 is a flow chart illustrating a method for creating radiomap data which may be performed within a system, such as that described with reference to FIG. 1, which includes a plurality of nodes of the first class 1-1 to 1-n, 2-1 to 2-n, 3-1 to 3-n (e.g. iBeacons) provided within a space 1, 2, 3. Operations of the method may be performed by the radio communication apparatus 10 (or a sub-set of components thereof), optionally in conjunction with the radiomap server 11 (or a sub-set of components thereof). As will be appreciated, in some examples, at least one operation of the method may be performed by an operator/installer/administrator of the apparatus 10, server 11 and or the system.

In operation S3.1, the radio communication apparatus 10 is caused to scan for plural nodes of the first class, which are identifiable only by a locally-unique identifier, provided within the space 1. In this scenario, radio communication apparatus 10 is of the first type and so is able to discern the LUIDs of the nodes of the first class without prior knowledge. In some specific examples, the nodes of the first class 1-1 to 1-n are iBeacons and the radio communication apparatus 10 is of a type which does not operate using the iOS operating system. For instance, the apparatus 10 may operate using an Android operating system.

The scanning may include the apparatus 10 of the first type scanning for incoming transmissions from the plural nodes of the first class 1-1 to 1-n. The apparatus 10 of the first type may be moved around within the space so as to cover the sufficient proportion of the area of the space. During scanning, the apparatus 10 may be configured to note the LUIDs of any nodes from which the transmissions are received while the apparatus 10 is at a particular position. The apparatus 10 may additionally note characteristics of the transmissions, for instance the RSSI, when it is at that position. The apparatus 10 may then be moved to a new position and may repeat the process of noting LUIDs and transmission characteristics for that new position. This may be repeated until a sufficient proportion of the area of the space has been covered.

In operation S3.2, based on results of the scan (e.g. the information recorded during the scan), creation of a portion of radiomap data may be performed. The created portion of radio map data corresponds to the scanned space. The creation may be performed by the apparatus 10 or may be performed by another entity, such as the server 11, in response to receiving the results of the scan from the apparatus 10. Put another way, the apparatus may perform creation of, or cause creation of, the portion of the radio map data. The portion of radiomap data could be said to identify and relate to a "set" of nodes of the first class that are within the space 1.

The exact method by which the radiomap data is created may not be important and a number of methods are known in the art, for instance in WO2012032376 and WO2012038779 A1. In any case, regardless of the method of creation, the radiomap data includes the LUIDs of the plural nodes 1-1 to 1-n of the first class and location information indicating relative locations within the space 1 of the plural nodes of a first class 1-1 to 1-n.

The method may additionally include the operation of S3.3 in which at least one node of the second class 1-x is provided in geographic location with the space 1. As alluded to above, this operation, if actually performed, may be carried out by a human participant such as an installer, administrator etc. The nodes 1-x of the second class may be provided at strategic locations in or near the space 1. For instance, the node of the second class 1-x may be provided at, or immediately outside, an entrance to the space, or at another high-traffic area in or near the space. As will be understood from the later discussion, provision of the node of the second class in a high-traffic area (i.e. one through which many end-users of the system will pass) may be beneficial.

Regardless of whether or not operation S3.3 is performed, the method may also comprise the apparatus of the first type 10 being caused (in operation S3.4) to scan for nodes of the second class 1-x. Scanning of the nodes of the second class 1-x may comprise the apparatus listening for transmissions from the node of the second class using the relevant transmission protocol (e.g. BLE or WiFi). Upon receiving a transmission from the node of the second class 1-x, the apparatus may record the GUID associated with that node. The apparatus 10 may or may not additionally record characteristics (such as RSSI) of the transmission received from the node of the second class 1-x. Scanning for the nodes of the second class may by performed at the same time as the scanning for nodes of the first class. Put another way, operations S3.2 and S3.4 as illustrated in FIG. 3 may be performed in a single operation.

The method may in some examples include operation S3.5, in which a globally unique identifier (GUID), which enables identification of the space 1 associated with the created portion of radiomap data, is associated with the created portion of radiomap data.

In some examples in which the space 1 includes a node of the second class 1-x, the GUID associated with the portion of the radio map data may be the GUID of the node of the second class. In other examples, the GUID may be some other identifier for allowing the space to be identified, such as GNSS coordinates or an identifier of a nearby cellular base station. In some examples, a portion of radiomap data may be a set of radio models for nodes from a certain geographical tile (e.g. a rectangular geographical area). In these examples, the GUID may for instance identify a particular corner of a tile (e.g. the southwest corner).

Association of the GUID with the portion of the radiomap data may be performed in any suitable way. For instance, the GUID may be inserted into the radiomap data or may be stored as a tag or metadata based on which the portion of the radiomap can be identified and accessed/retrieved.

Finally in operation S3.6, the created portion of radiomap data is stored for later use. As discussed above, if applicable, the at least one GUID is stored in association with the portion of the radio map data. Storage of the portion of the radiomap data, and the at least one GUID if applicable, may be performed by the server 11 or by the apparatus 10. Storage by the server 11 might in some examples be caused by the apparatus 10 if, for example, storage is performed by the server 11 in response to receipt of the portion of radiomap data or the scan results from the apparatus 10.

The stored portion of the radiomap data may only form part of a larger quantity of radiomap data, for instance including multiple portions of radio map data each corresponding to a different space. The portion of the radio map data and/or the larger radiomap data may include LUIDs of nodes of the first class which are identical (due to the non-unique nature of the LUIDs). One or more of the portions of which the larger radio map data is comprised may be identifiable via at least one associated GUID.

Although not shown in the Figures, in some examples, a device of the second type might be used to create the portion of radiomap data if information regarding LUIDs of the nodes of the first class in the area to be mapped is already available. This may be the case, for instance, if a radiomap of the area was created previously using a device of the first type and updated radiomap data is being created.

Figure 4:
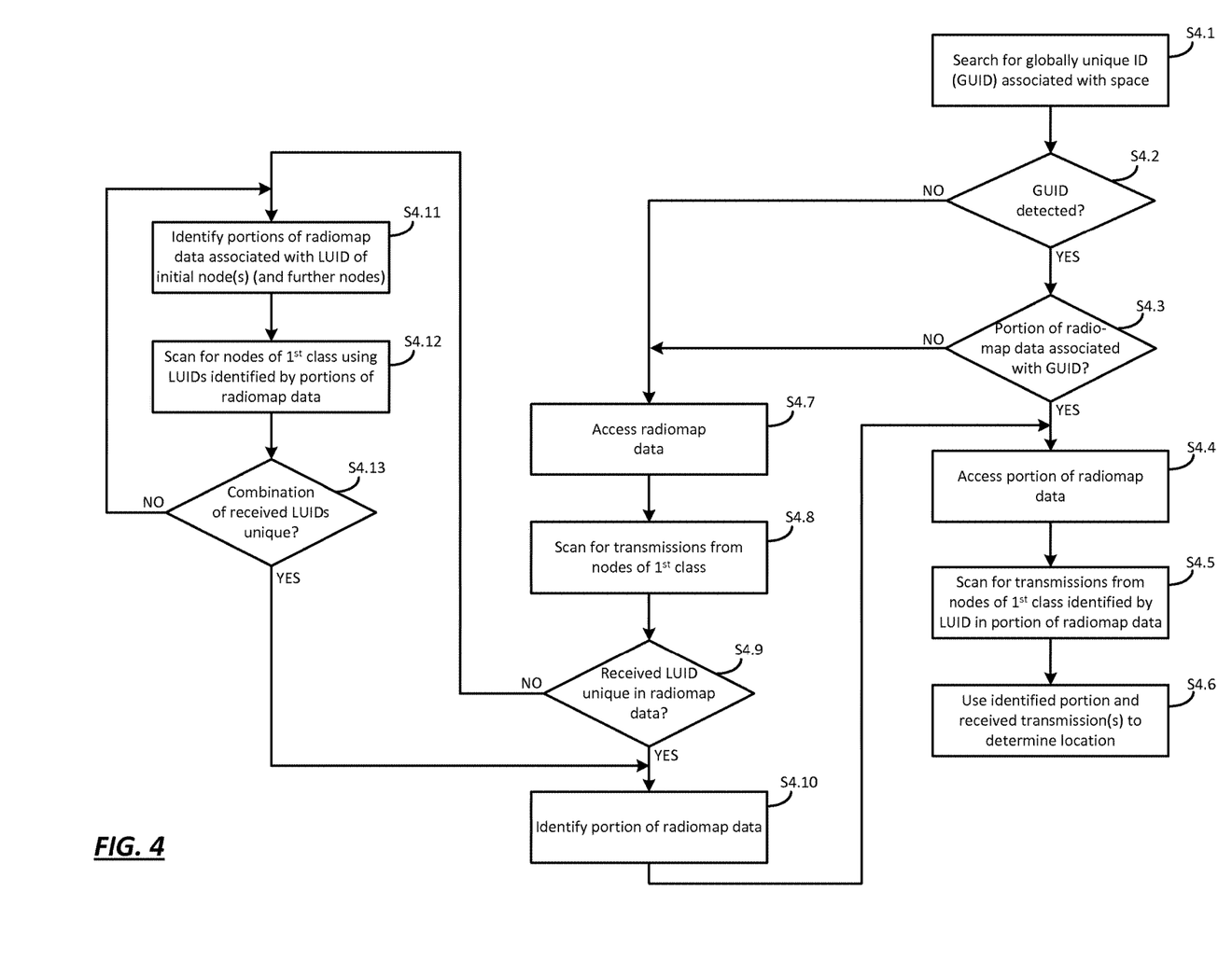
FIG. 4 is a flow chart illustrating a method for using radiomap data, which may be performed within a system such as that described with reference to FIG. 1.

FIG. 4 is a flow chart illustrating an example of a method in which radiomap data is accessed and used. The radiomap data, at least a portion of which may have been created using a method as described with reference to FIG. 3, includes location information indicating locations of plural nodes of a first class, each of the plural nodes of the first class being identifiable by a locally-unique identifier which is included in the radiomap data. In some examples, the radiomap data additionally includes location information associated with GUIDs of nodes of the second class.

The radio communications apparatus 10 which performs various operations of the method illustrated in FIG. 4 may be of either the first or second type (e.g. may be an a non-iOS device or an iOS device). This is because, once the LUIDs of the first class are known, devices of either type are able to use the known LUIDs to scan for associated nodes of the first class.

In operation, S4.1, subsequent to being set into a positioning mode, the apparatus 10 is caused to search for a globally unique identifier (GUID) for enabling identification of a space provided with plural nodes of the first class. Setting of the communication apparatus 10 into the positioning mode may be performed either automatically or manually.

Searching for the GUID may comprise scanning for one or more nodes of the second class 1-x, each of which has an associated GUID, in the vicinity of the apparatus 10. This scanning for nodes of the second class 1-x may be performed in any suitable way and may depend on the nature and transmission protocols of nodes of the second class 1-x. The scanning for nodes of the second class 1-x may include scanning successively using different protocols thereby to identify to enhance the chance of finding a node of the second class 1-x.

Additionally or alternatively, searching for the GUID may include, but is not limited to, searching for positioning coordinates (such as GPS coordinates) or GUIDs of nearby cellular base stations.

Next, in operation S4.2, it is determined by the apparatus 10 if one or more GUID was detected during the search. If a positive determination (i.e. if it is determined that one or more GUID was detected during the search) is reached, operation S4.3 is performed. If a negative determination (i.e. if it is determined that one or more GUID was not detected during the search) is reached, the method proceeds to operation S4.7, which will be discussed later.

In operation S4.3, the computing apparatus causes performance of a determination as to whether a portion of stored radiomap data is associated with one or more of the discovered GUIDs. This determination may be performed by either the computing apparatus 10 or the server 11, for instance in response to receiving the discovered GUIDs from the apparatus 10. The determination may include, for instance, searching through an index of GUIDs each associated with a portion of radiomap data. In some examples, if the GUID is in the form of Latitude/Longitude coordinates determined based on GNSS, Cellular, WiFi or any other positioning technology, the portion of radiomap data can be determined as a corresponding tile of the radiomap, i.e. the tile which contains the Latitude and Longitude.

If a positive determination is reached (i.e. a determination that a portion of the stored radiomap data is associated with one of the discovered GUIDs), the method proceeds to operation S4.4. If instead a negative determination is reached, the method proceeds to operation S4.7.

In operation S4.4, the identified portion of the radiomap data associated with the discovered GUID is accessed by the apparatus 10. The identified portion of the radiomap data may be accessed individually without the remainder of the larger radiomap data also being accessed.

Accessing the identified radiomap portion may comprise downloading the radiomap portion from the server 11 to the apparatus 10 based on the discovered GUID. Alternatively, for instance where the larger radiomap data is stored locally at the apparatus 10, the accessing the data may comprise accessing the identified portion from local memory of the apparatus 10. In examples in which only the identified portion of the radiomap data is retrieved from the server 11 (and not the entire larger radio map data) the quantity of data transfer might be significantly reduced by identifying the portion based on the GUID, instead of retrieving the entire lager radiomap data.

Subsequent to accessing the identified portion of radiomap data, in operation S4.5 the apparatus 10 is caused to scan for transmissions from nodes of the first class whose LUIDs are identified by the portion of radiomap data. Scanning may include listening for transmissions from the nodes. When transmissions are received, the apparatus 10 may record the LUID of each node from which the transmissions are received and may also record characteristic (e.g. RSSI) of the received transmissions.

Subsequently, in operation S4.6, the results of the scan (i.e. the recorded information) and the portion of radiomap data are used to determine the location apparatus 10 within the space 1. For instance, the radiomap data may be examined to identify a location within the space at which it would be expected to receive transmissions from each the nodes from which transmissions were received during the scan. The RSSI information may also be used to identify the location by comparing recorded RSSI levels for each received transmission with RSSI levels that would be expected (based on the radiomap data) at a given location within the space. It will be appreciated that this explanation of the use of the radiomap data is an example only. Exact methods used for determining the location based on the radiomap data and the scan results are known to the skilled person (see, for instance, WO 2012038779) and so are not discussed in further detail.

Returning now to operation S4.5, the scan for transmissions may include a scan for each node of the first class identified by the radiomap data. However, in some examples, an initial scan for a subset of the identified nodes may be performed. The subset may be high priority nodes, for instance nodes located in positions having high traffic. Alternatively, the subset of nodes may simply be a sample of nodes spread evenly throughout the space 1. In some examples, a random subset of nodes might be scanned for during the initial scan. After recording the results of the initial scan, which may be at least the LUIDs of the nodes from which transmissions have been received, a second scan may be performed. In the second scan, only those nodes which are sufficiently close to node(s) from which transmissions were received during the initial scan may be scanned for. Based on the LUIDs (and e.g. RSSI information) recorded in the second scan, the location of the apparatus 10 may be determined. If in the initial scan, no transmissions are received, a second subset of nodes may be scanned for or, alternatively, all of the nodes identified by the radiomap data (perhaps excluding the first subset) may be scanned for. Using this iterative approach to scanning may reduce the overall amount of scanning that is required.

Let's return now to operation S4.7, which may be performed in response to a negative determination in either of operations S4.2 and S4.3. In operation S4.7, if no specific portion of the radiomap data has been identified, radiomap data, which may not be specific to the space in which the apparatus is located is accessed. The accessed radiomap data may be the entire stored larger radiomap data. As discussed above, accessing the radiomap data may comprise downloading the radiomap data from the server 11 to the apparatus 10 or alternatively retrieving the data from local memory of the apparatus 10.

Next, in operation S4.8, the apparatus 10 is caused to scan for transmissions from of one or more of the plural nodes of the first class whose locally-unique identifiers are identified by the radiomap data. This may comprise scanning for transmissions from all nodes identified in the radiomap data.

Alternatively, scanning for transmissions from of one or more of the plural nodes may comprise scanning for transmissions from a subset of the nodes identified in the radio map data. As discussed above, the subset may consist of nodes that have been previously identified as high priority. High priority nodes may be for instance those located at or near entrances to the various spaces associated with the larger radiomap data and/or other such busy or high traffic areas. In other examples, the subset may be selected on the basis that the nodes are relatively evenly spread throughout the plural spaces 1, 2, 3 or on a random basis. The scanning of only a subset of nodes may reduce the amount of scanning that is required overall. In examples in which scanning is only performed for a subset of nodes, the accessing of operation S4.7 may include initially accessing only part of the radiomap data, for instance, the LUIDs of the subset of nodes. This may reduce the amount of data that is required to be downloaded.

In operation S4.9, it is determined if any of the LUIDs of nodes from which a transmission is received during the scanning of operation S4.8 is unique in the entire larger radiomap data.

If it is determined that the LUID is unique in the radiomap data the method proceeds to operation S4.10 in which a portion of the radiomap data with which the unique LUID is associated is identified. Due to the uniqueness of the LUID within the radiomap data, only one portion of radiomap data will have that particular LUID and consequently the portion can be identified relatively easily. The identified portion of radiomap data may be associated with a set of nodes within a particular space 1, 2, 3.

After identification of the portion of radiomap data in operation S4.10, the method proceeds to operation S4.4 in which the identified access portion is accessed. If, for instance, the entire radiomap data was already accessed in operation S4.7, operation S4.4 may be redundant and instead the method may proceed directly from operation S4.10 to operation S4.5 followed by operation S4.6. Operations S4.5 and S4.6 may be performed as described previously.

Returning now to operation S4.9, if it is determined that none of the LUIDs of nodes from which a transmission is received during the scanning of operation S4.8 is unique, the method proceeds to operation S4.11. In operation S4.11, the one or more portions of radiomap data which include the instances of the non-unique at least one LUID identified during the scanning operation of S4.8 are identified.

Next, in operation S4.12, the apparatus 10 causes a scan to be performed for nodes having LUIDs identified by the one or more radiomap data portions identified in operation S4.11.

Subsequently, in operation S4.13, it is determined whether any combination of a non-unique LUID of a node detected in the scanning of operation S4.8 with an LUID of node detected in the scanning of S4.12 is unique to any portions of the radiomap data. If it is determined that a detected combination of LUIDs is unique to a single portion of the radiomap data, the method proceeds to operation 4.10 in which the portion of radiomap data is identified. After this the method proceeds to operation S4.4 or S4.5, as applicable depending on the quantity of radio map data accessed in operation S4.7.

If it is determined, in operation S4.13, that no unique combination of LUIDs has been detected, the method returns to operation S4.11 in which the portions which have instances of the combinations of LUIDs are identified. After this a further scan is performed using the LUIDs of the identified portions. Operations S4.11 and S4.12 are repeated until a combination of plural LUIDs that is unique to a particular portion of radiomap data is detected and the method can proceed to operation S4.10 and ultimately to S4.6 in which the identified radiomap data portion is used to determine a location of the apparatus 10.

It will thus be understood that operations described with reference to S4.8 to S4.13 serve to iteratively (or successively) to discount (or eliminate from consideration) portions of the radiomap data based on transmissions successively received from different ones of the plural nodes identified in the radiomap data. Ultimately, this allows a single radiomap data portion, which can be used to determine the location of the apparatus, to be identified. This iterative process may serve to reduce the total amount of scanning and processing that is to be performed.

In some examples, the determination as to which portion (s) of radiomap data should be downloaded to the device may be performed by the server 11. In such examples, the apparatus 10 may send the results of the scans performed in one or both of S4.8 and S4.12 to the server 11 which may use the results to perform any one or more of operations S4.9, S4.10, S4.11 and S4.13, thereby to identify a relevant portion of radiomap data to transfer to the apparatus 10. In such examples, the server 11 may be configured to respond to receipt of scan results by using the radiomap data to suggest combinations of LUIDs for which the apparatus 100 should scan. This may speed up the process of identifying the relevant portion of radiomap data, when communication between server 11 and apparatus 100 is possible.

The scanning operations described with reference to any of operations S4.8 and S4.12 may be controlled such that scanning operation lasts until a first transmission is received. Subsequently, the uniqueness of the LUID of the single transmission may be considered and the method may continue accordingly. This may reduce the total time and processing and power resources spent performing the scanning. Alternatively the apparatus 100 may be configured to scan until a certain number of transmissions are received. In some examples, the scans may instead scan through all the nodes in the radiomap data, portions of radio map data or subset of LUIDs.

It will of course be appreciated that the methods of FIGS. 3 and 4 are examples only. As such, certain steps may be omitted. For instance, at least operation S3.3 and/or operation S3.4 of FIG. 3 may be omitted. In some examples, operation S3.5 may also be omitted. Likewise, with regard to FIG. 4, in some examples such as those in which globally unique identifiers are not used, operations S4.1 to S4.3 might be omitted and the method may begin at operation S4.7. Similarly, the orders in which various operations are performed may be different from the orders illustrated in FIGS. 3 and 4.

With regard to the entities that perform the operations shown in the methods of FIGS. 3 and 4, these may be performed by a single entity or by a combination of more than one entities. For instance, in some examples, the apparatus 10 may be configured to perform all of the operations of FIG. 3. Similarly, the apparatus 10, or a subset of components thereof could be said to cause performance of the operations described with reference to FIG. 3. However, in some examples, while the apparatus 10 (or a subset of components thereof) could be said to cause performance of the operations, various operations may be actually performed by the server 11. These operations include but are not limited to one or more of: operations S4.3, S4.6, S4.9, S4.11, and S4.12. For example, the server 11 may be caused to perform the determination of operations S4.3 and/or S4.9 in response to receiving a GUID and/or a LUID respectively from the apparatus 10.

While various operations of FIG. 3 might be performed by a single radio communication apparatus 10 of the first type (e.g. one which runs an Android operating system), they might equally be performed by a combination of multiple different apparatuses 10 of the first type. Similarly, the whole database of radiomap data (relating to plural different spaces) may be gathered by multiple different apparatuses of the first type, for instance using crowd-sourcing.

Although, in the above embodiments, the term "space" has generally been used to refer to an entire space, it might equally apply to one part of a larger space. For instance, an entire floor of a shopping mall may in some examples be considered to be a single space but in others the floor may be plural "spaces" as described in this specification. Each of the plural spaces may have a portion of radiomap data associated with it.

Figure 5A:
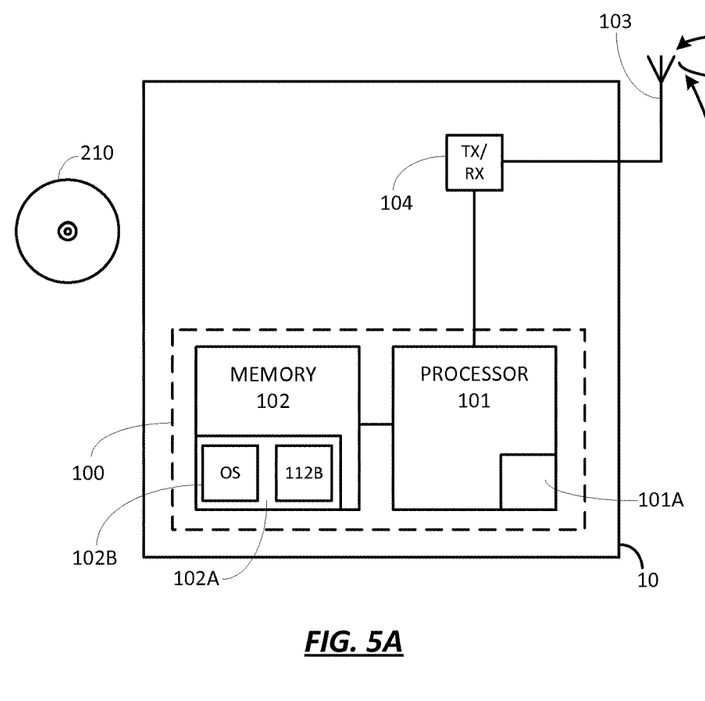
FIGS. 5A to 5C are simplified schematics illustrating exemplary arrangements of apparatuses within a system such as that of FIG. 1.
Figures 5B, 5C:
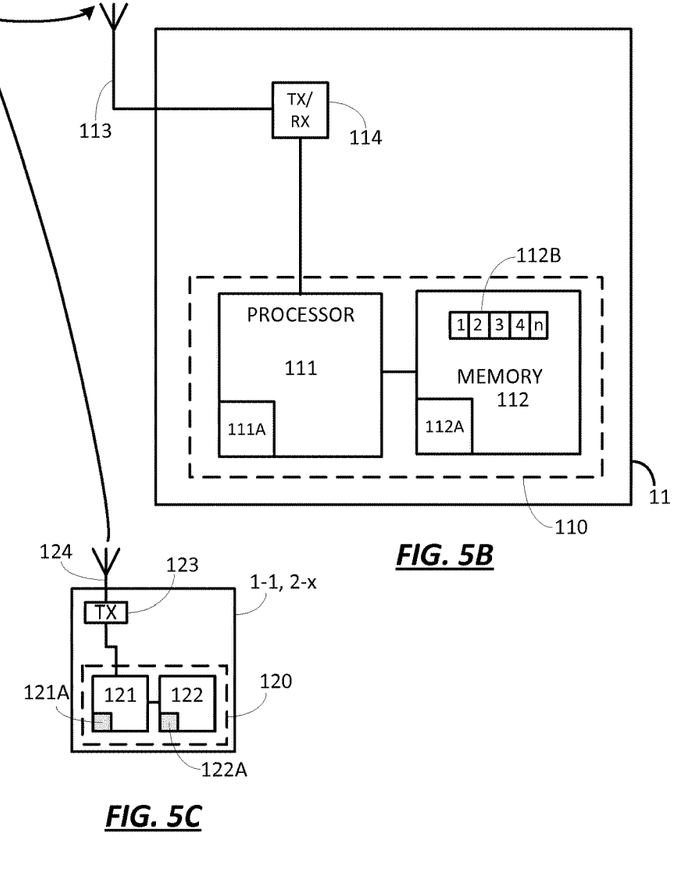

FIGS. 5A, 5B and 5C are example configurations of the various entities that make up the system of FIG. 1. Specifically, FIG. 5A illustrates an example configuration of a radio communication apparatus 10, FIG. 5B illustrates an example configuration of the radiomap data server 11 and FIG. 5C illustrates an example configuration of a node 1-1 of the first type.

Each of the entities 10, 11, 1-1, 1-x includes a controller 100, 110, 120. Each of the controllers 100, 110, 120 includes processing circuitry 101, 111, 121 coupled with memory 102, 112, 122.

The memory 102, 112, 122 has stored thereon computer-readable instructions 102A, 112A, 122A, which when executed by the processing circuitry 101, 111, 121 causes the apparatus 11, 11, 1-1 1-x or entity in which the controller 100, 110, 120 is provided to perform the various functions described above with reference to FIGS. 1 to 4.

The memory 102 of the radio communication apparatus 10 may also have stored thereon the operating system 102B (e.g. iOS or non-iOS) which may define its type as discussed above.

The memory 112 of the radiomap server 11 additionally has stored therein, the radiomap data 112B, which may be divided into portions 112B-1 to 112B-n each corresponding to a difference space. In some examples, the radiomap data may be stored locally on the communication apparatus 10 and, in those examples, the radiomap data 112B, which may be in plural portions, may be stored in the memory 102 of the communication apparatus 10.

The communication apparatus 10 also includes at least one antenna 103 and at least one transceiver 104 (transceiver circuitry). The at least one antenna 103 and transceiver circuitry 104 are configured, under the control of the controller 100 to transmit and receive data packets. The at least one antenna 103 and transceiver circuitry 104 may be configured to operate using a single protocol such as BLE. Alternatively, they may enable communication using multiple different protocols. For instance, multiple transceivers 104 (and antennas 103 if required) may be included for operation using two or more of BLE, WiFi, Cellular and GPS protocols.

The radiomap data server 11 (which may be referred to as radiomap data server apparatus) includes at least one antenna 113 and at least one transceiver 114 for enabling data/messages to be transmitted to and received from the communications apparatus 10. The server 11 may be configured for transmissions using one or more transmission protocol of any suitable type.

The node 1-1 of the first class, which may be referred to simply as a "beacon", in its most simple form includes, in addition to its controller 120, a transmitter 124 and an antenna 123. In such examples, the node 1-1 is able only to transmit message data packets (e.g. advertisement data packets) but may be unable to receive data packets. Alternatively, the node may also include receiver functionality for receiving packets. The node of the first class 1-1 may be configured to communicate using only a single protocol, such as BLE, although this need not necessarily be the case. As discussed above an example of a node of the first class is Apple's iBeacon™. Nodes of the second class 1-x may in their simplest form include only the components described with reference to the node of the first class. However, they may alternatively include other components depending on the nature/primary function of the node of the second class 1-x.

Any of the described apparatuses or entities may comprise only the indicated components or one or more additional components. Any of the described apparatuses or entities may be a module or a component for a device, for example a chip. Alternatively, any of the described apparatuses or entities may be a device, for instance a server or a mobile terminal, or form part thereof. Examples of such mobile terminals include mobile phones, personal digital assistants (PDAs), mobile computers, e.g. laptops, notebooks or tablet computers, digital music players etc. Any of the described apparatuses, may for instance comprise a user interface in addition to a communication interface (e.g. a transceiver) and/or an antenna.

Some further details of components and features of the above-described apparatuses 10, 11, 1-1, 1-x and alternatives for them will now be described.

The processing circuitry 101, 111, 121 of any of the apparatuses 10, 11, 1-1, 1-x of FIGS. 5A to 5C may be of any suitable composition and may include one or more processors 101A, 111A, 121A. For example, the processing circuitry 101, 111, 121 may be a programmable processor that interprets computer program instructions and processes data. The processing circuitry 101, 111, 121 may include plural programmable processors. Alternatively, the processing circuitry 101, 111, 121 may be, for example, programmable hardware with embedded firmware. The processing circuitry may be termed processing means. The processing circuitry may alternatively or additionally include one or more Application Specific Integrated Circuits (ASICs). In some instances, the processing circuitry may be referred to as computing apparatus.

The processing circuitry 101, 111, 121 is coupled to the respective memory (or one or more storage devices) 102, 112, 122 and is operable to read/write data to/from the memory 102, 112, 122. The memory 102, 112, 122 may comprise a single memory unit or a plurality of memory units, upon which the computer readable instructions (or code) 102A, 112A, 122A is stored. For example, the memory 102, 112, 122 may comprise both volatile memory and non-volatile memory. For example, the computer readable instructions 102A, 112A, 122A may be stored in the non-volatile memory and may be executed by the processing circuitry 101, 111, 121 using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 102A, 112A, 122A may be pre-programmed into the apparatuses 10, 11, 1-1, 1-x. Alternatively, the computer readable instructions 102A, 112A, 122A may arrive at the apparatus 10, 11, 1-1, 1-x via an electromagnetic carrier signal or may be copied from a physical entity 210 (see FIG. 5A) such as a computer program product, a memory device or a record medium such as a CD-ROM or DVD. The computer readable instructions 102A, 112A, 122A may provide the logic and routines that enables the devices/apparatuses 10, 11, 1-1, 1-x to perform the functionality described above.

The combination of computer-readable instructions stored on memory (of any of the types described above) may be referred to as a computer program product.

Where applicable, the BLE-capability of the apparatuses 10, 11, 1-1, 1-x may be provided by a single integrated circuit. It may alternatively be provided by a set of integrated circuits (i.e. a chipset). The BLE-capability may alternatively be a hardwired, application-specific integrated circuit (ASIC).

Although the specific embodiments have been described primarily with reference to Bluetooth Low Energy (BLE), it will be appreciated that other suitable protocols may alternatively be used. Such protocols may include 802.11 wireless local area network protocols, other types of Bluetooth protocol, Ultra wideband (UWB) protocols or Zigbee protocols.

As will be appreciated, the apparatuses 10, 11, 1-1, 1-x described herein may include various components which have may not been shown in the Figures. For example, the mobile radio communications apparatus 10 may comprise an additional communication interface which may be configured to allow two-way communication with external devices and/or networks.

The communication interface may be configured to communicate wirelessly via one or more of several protocols such as Global System for Mobile Communications (GSM), Code Division Multiple Access (CDMA), Universal Mobile Telecommunications System (UMTS) and IEEE 802.11 (Wi-Fi). Alternatively or additionally, the communication interface may be configured for wired communication with a device or network.

The apparatuses 10, 11, 1-1, 1-x may comprise further optional SW components which are not described in this specification since they may not have direct interaction to embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc, or a "processor" or "processing circuitry" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
searching by a radio communications apparatus for a globally-unique identifier for enabling identification of a space;
in response to detecting the globally-unique identifier for enabling identification of the space with the globally-unique identifier being received at the radio communications apparatus, identifying a portion of radiomap data based on the globally unique identifier and using the identified portion of the radiomap data to determine a location of the radio communications device;
accessing the portion of radiomap data based on locations of one or more nodes of a second class that have been detected, each of the one or more nodes of the second class being identifiable by a globally-unique identifier, the portion of the radiomap data including location information indicating locations of plural nodes of a first class, each of the plural nodes of the first class being respectively identifiable only by a locally-unique identifier that has a different level of uniqueness than the globally-unique identifier by enabling identification of a respective node of the first class on a local level but failing to definitively identify the respective node of the first class on a global scale without additional information, the locally-unique identifiers of the plural nodes being included in the radiomap data;
identifying the plural nodes of the first class from the portion of the radiomap data that has been accessed based on the locations of the one or more nodes of the second class, wherein the plural nodes of the first class are identified by the portion of the radiomap data to be within the space identified by the one or more nodes of the second class, the globally unique identifier enabling identification of the space;
scanning for the plural nodes of the first class that were identified by the portion of the radiomap data to be within the space identified by the one or more nodes of the second class;
using the identified portion of the radiomap data to determine the location within the space of the radio communication apparatus based on at least one transmission received by the radio communications apparatus from at least one of the plural nodes of the first class, the at least one transmission including the locally-unique identifier of the node from which the transmission is received,
wherein using the portion of the radiomap data to determine the location within the space comprises scanning for transmissions from each of a set of one or more of the plural nodes of the first class whose locally-unique identifiers are identified by the radiomap data, wherein the portion of the radiomap data is associated with the set of nodes and indicates relative locations within the space of the nodes of the set;
if the globally-unique identifier for enabling identification of the space is not detected, scanning for transmissions from at least one of the plural nodes of the first class identified by the radiomap data; and
identifying the portion of the radiomap data based on at least one transmission received in response to the scanning and using the identified portion of the radiomap data to determine the location the radio communications device.

2. The method of claim 1, wherein the locally-unique identifier of each of the nodes of the first class is visible to radio communication apparatus of a first type without the radio communication apparatus of the first type having prior knowledge of the locally-unique identifier but is invisible to radio communication apparatus of a second type without the radio communication apparatus of the second type having prior knowledge of the locally-unique identifier.

3. The method of claim 2, wherein the radio communication apparatus of the first type is configured to utilise a different operating system than do radio communication apparatuses of the second type.

4. The method of claim 2, wherein data for the radiomap data is created using one or more radio communication apparatuses of the first type.

5. The method of claim 1, wherein accessing the portion of the radiomap data comprises accessing only the identified portion of the radiomap data.

6. The method of claim 1, wherein the searching for the globally-unique identifier for enabling identification of the space comprises scanning for nodes of the second class.

7. The method of claim 1, wherein the at least one of the plural nodes of the first class identified by the radiomap data from which transmissions are scanned is a selected subset of all the plural nodes of the first class identified by the radiomap data.

8. The method of claim 7, wherein information for enabling identification of the selected subset of nodes may be received from a remote server apparatus.

9. The method of claim 7, the selected subset of nodes having been identified as high priority nodes.

10. The method of claim 1, wherein identifying the portion of the radiomap data based on at least one transmission received in response to the scanning for transmissions from at least one of the plural node of the first class identified by the radiomap data comprises:
successively discounting parts of the radiomap data based on transmissions successively received from different ones of the plural nodes of the first class identified by the radiomap data, thereby to arrive at the identified portion of the radiomap data.

11. The method of claim 1, wherein accessing the radiomap data comprises downloading the radiomap data from a remote server.

12. A method comprising:
using a radio communication apparatus of a first type to scan for plural nodes of a first class provided within a space, each of the plural nodes of the first class being respectively identifiable only by a locally-unique identifier that enables identification of a respective node of the first class on a local level but that fails to definitively identify the respective node of the first class on a global scale without additional information, the locally-unique identifiers of the plural nodes of the first class being visible to radio communication apparatuses of the first type without the radio communication apparatuses of the first type having prior knowledge of the locally-unique identifier and being invisible to a radio communication apparatus of a second type without the radio communication apparatus of the second type having prior knowledge of the locally-unique identifier;

based on results of the scan for the plural nodes of the first class, creating a portion of radiomap data including the locally-unique identifiers of the plural nodes of the first class and location information indicating relative locations within the space of the plural nodes of the first class, wherein the location of a node of the plural nodes of the first class is received from the node by the radio communication apparatus of the first type; and associating the portion of the radiomap data with a globally-unique identifier of each of one or more nodes of a second class that have been detected within the space in order to enable identification of the space associated with the portion of the radiomap data, wherein the globally-unique identifier has a different level of uniqueness than the locally-unique identifier wherein the radio communication apparatus of the first type is configured to utilize a different operating system than do the radio communication apparatuses of the second type.

13. The method of claim 12, the at least one node of the second class being geographically associated with the space.

14. The method of claim 13, further comprising using the radio communication apparatus of the first type to scan for nodes of the second type which are geographically associated with the space.

15. The method of claim 14, wherein the globally-unique identifier of the least one node of the second class is associated with the portion of radiomap data in response to detecting the node of the second type during the scan for nodes of the second type.

16. The method of claim 13, further comprising positioning at least one node of the second class in geographical association with the space.

17. An apparatus comprising:
at least one processor; and
at least one memory having computer-readable code stored thereon, the computer-readable code, when executed by the at least one processor, causing the apparatus at least:
to access a portion of radiomap data based on locations of one or more nodes of a second class that have been detected, each of the one or more nodes of the second class being identifiable by a globally-unique identifier, the portion of the radiomap data including location information indicating locations of plural nodes of a first class, each of the plural nodes of the first class being respectively identifiable only by a locally-unique identifier that has a different level of uniqueness than the globally-unique identifier by enabling identification of a respective node of the first class on a local level but failing to definitively identify the respective node of the first class on a global scale without additional information, the locally-unique identifiers of the plural nodes being included in the radiomap data;
to identify the plural nodes of the first class from the portion of the radiomap data that has been accessed based on the locations of the one or more nodes of the second class, wherein the plural nodes of the first class are identified by the portion of the radiomap data to be within a space identified by the one or more nodes of the second class;
to scan for the plural nodes of the first class that were identified by the portion of the radiomap data to be within the space identified by the one or more nodes of the second class; and
to use the portion of the radiomap data to determine a location within the space of a radio communication apparatus based on at least one transmission received by the radio communications apparatus from at least one of the plural nodes of the first class, the at least one transmission including the locally-unique identifier of the node from which the transmission is received,
wherein the locally-unique identifier of each of the nodes of the first class is visible to radio communication apparatus of a first type without the radio communication apparatus of the first type having prior knowledge of the locally-unique identifier but is invisible to radio communication apparatus of a second type without the radio communication apparatus of the second type having prior knowledge of the locally-unique identifier, and
wherein the radio communication apparatus of the first type is configured to utilize a different operating system than do radio communication apparatuses of the second type.

18. The apparatus of claim 17, wherein data for the radiomap data is created using one or more radio communication apparatuses of the first type.

19. The apparatus of claim 17, wherein the computer-readable code, when executed, causes the apparatus to use the radiomap data to determine the location within the space by scanning for transmissions from each of a set of one or more of the plural nodes of the first class whose locally-unique identifiers are identified by the radiomap data.

20. The apparatus of claim 19, wherein the computer-readable code, when executed, causes the apparatus to:
identify the portion of the radiomap data based on the globally-unique identifier received at the radio communications apparatus, the globally unique identifier enabling identification of the space, wherein the portion of the radiomap data is associated with the set of nodes and indicates relative locations within the space of the nodes of the set; and
use the identified portion of the radiomap data to determine the location within the space of the radio communication apparatus.

21. The apparatus of claim 20, wherein accessing the portion of the radiomap data comprises accessing only the identified portion of the radiomap data.

22. The apparatus of claim 20, wherein the computer-readable code, when executed, causes the apparatus to:
search for the globally-unique identifier for enabling identification of the space; and
in response to detecting the globally-unique identifier for enabling identification of the space, to identify the portion of the radiomap data based on the globally unique identifier and to use the identified portion of the radiomap data to determine the location of the radio communications device.

23. The apparatus of claim 22, wherein the computer-readable code, when executed, causes the apparatus to:
if the globally-unique identifier for enabling identification of the space is not detected, scan for transmissions from at least one of the plural nodes of the first class identified by the radiomap data; and identify the portion of the radiomap data based on at least one transmission received in response to the scanning and use the identified portion of the radiomap data to determine the location the radio communications device.

24. The apparatus of claim 23, wherein the at least one of the plural nodes of the first class identified by the radiomap data from which transmissions are scanned is a selected subset of all the plural nodes of the first class identified by the radiomap data.

25. The apparatus of claim 24, wherein information for enabling identification of the selected subset of nodes is received from a remote server apparatus.

26. The apparatus of claim 24, the selected subset of nodes having been identified as high priority nodes.

27. The apparatus of claim 22, wherein the computer-readable code, when executed, causes the apparatus to search for the globally-unique identifier for enabling identification of the space by scanning for nodes of the second class.

28. The apparatus of claim 27, wherein the computer-readable code, when executed, causes the apparatus to identify the portion of the radiomap data based on at least one transmission received in response to the scanning for transmissions from at least one of the plural node of the first class identified by the radiomap data by successively discounting parts of the radiomap data based on transmissions successively received from different ones of the plural nodes of the first class identified by the radiomap data, thereby to arrive at the identified portion of the radiomap data.

29. The apparatus of claim 17, wherein accessing the radiomap data comprises downloading the radiomap data from a remote server.

30. An apparatus comprising:
at least one processor; and
at least one memory having computer-readable code stored thereon, the computer-readable code, when executed by the at least one processor, causing the apparatus at least:
to use a radio communication apparatus of a first type to scan for plural nodes of a first class provided within a space, each of the plural nodes of the first class being respectively identifiable only by a locally-unique identifier that enables identification of a respective node of the first class on a local level but that fails to definitively identify the respective node of the first class on a global scale without additional information, the locally-unique identifiers of the plural nodes of the first class being visible to radio communication apparatuses of the first type without the radio communication apparatuses of the first type having prior knowledge of the locally-unique identifier and being invisible to a radio communication apparatus of a second type without the radio communication apparatus of the second type having prior knowledge of the locally-unique identifier;
based on results of the scan for the plural nodes of the first class, to create a portion of radiomap data including the locally-unique identifiers of the plural nodes of the first class and location information indicating relative locations within the space of the plural nodes of the first class, wherein the location of a node of the plural nodes of the first class is received from the node by the radio communication apparatus of the first type; and
to associate the portion of the radiomap data with a globally-unique identifier of each of one or more nodes of a second class that have been detected within the space in order to enable identification of the space associated with the portion of the radiomap data, wherein the globally-unique identifier has a different level of uniqueness than the locally-unique identifier,
wherein the radio communication apparatus of the first type is configured to utilize a different operating system than do the radio communication apparatuses of the second type.

31. The apparatus of claim 30, the globally-unique identifier being that of a node of the second class, the at least one node of the second class being geographically associated with the space.

32. The apparatus of claim 31, wherein the computer-readable code, when executed, causes the apparatus to use the radio communication apparatus of the first type to scan for nodes of the second type which are geographically associated with the space.

33. The apparatus of claim 32, wherein the computer-readable code, when executed, causes the apparatus to associate the globally-unique identifier of the least one node of the second class with the portion of radiomap data in response to detecting the node of the second type during the scan for nodes of the second type.

* * * * *